United States Patent

[11] 3,546,436

[72] Inventor Walter K. Holzer
 Drosteweg 19, Meersburg, Bodensee, Germany
[21] Appl. No. 681,495
[22] Filed Nov. 8, 1967
[45] Patented Dec. 8, 1970
[32] Priority Nov. 11, 1966, Jan. 26, 1967
[33] Germany
[31] Nos. H60973 and H61664

[54] ELECTRONIC HEAT REGULATION
 4 Claims, 10 Drawing Figs.
[52] U.S. Cl. ................................................ 219/504
[51] Int. Cl. ................................................ H05b 1/02
[50] Field of Search .......................................... 219/505, 504; 523/94; 219/504

[56] References Cited
UNITED STATES PATENTS
3,395,265 7/1968 Weir ............................ 219/505
3,338,476 8/1967 Marcoux ...................... 219/505
3,275,802 9/1966 Vandivere et al. ............. 219/505
3,400,252 9/1968 Haya Kawa et al. .......... 219/505
3,067,311 12/1962 Lacy-Hulbert ................ 219/504

Primary Examiner—Bernard A. Gilheany
Assistant Examiner—F. E. Bell
Attorney—Mason, Fenwick & Lawrence ABSTRACT: A system for the electronic regulation of electric resistance heating elements of the positive temperature coefficient of resistance type for washing machines, stove heating units, and the like. Heating is regulated by contact-free electronic circuits activated responsive to variations in resistance of the heating element which bear a predetermined relation to heating element temperature. The circuits terminate the supply of heating current to the heating element when its resistance, and therefore temperature, reaches a preselected upper value and reestablish supply of heating current to the heating element when its resistance drops to a preselected lower value.

INVENTOR
WALTER K. HOLZER
BY Mason, Fenwick & Lawrence
ATTORNEYS

INVENTOR

WALTER K. HOLZER

BY Mason, Fenwick & Lawrence
ATTORNEYS

INVENTOR
WALTER K. HOLZER ered by the temperature of the medium that is to be heated is already an accepted part of programme control. All that is necessary is for the programme control arrangements to supply the characteristic magnitudes to the electronic regulator switching in the form of electrical magnitudes, used hitherto with contact systems.

ELECTRONIC HEAT REGULATION

ELECTRONIC HEAT REGULATION

The invention relates to a system of electronic heat regulation, primarily for use in regulating the heating elements of washing machines or boiling plates.

It is standard practice to regulate electric heating by means of a thermostat, according to temperature settings. Another practice is to divide the heating power feed into time-controlled periodic impulses and to regulate it by varying the ratio between the switch-on and switch-off periods. A feature common to both methods is that such intermittent working results in fluctuating loads on the heating elements, sparking trouble and control irregularities. Regulation to produce nonfluctuating values is scarcely possible, because the registering of the temperatures by the thermostat and/or the adjustment of the time-controlled values is subject to material delay, with the result that regulation usually goes beyond the values aimed at.

The invention sets out to carry out the heating regulation electronically, with the aid of various arrangements, in such a way that inexpensive heating elements can be used, with more precise adjustment to constant temperatures. The possibility of avoiding overloads on the heating elements enables cheaper materials to be used for these elements.

Another aim of the invention is to introduce contact-free regulation and such a low time constant that optimum regulation standards are maintained.

It is also important that the electronic heating regulation arrangements be so designed as to provide protection against washing machines running dry and boiling plates being overloaded.

It is proposed, according to the invention, to use the resistance of the heating element as the regulating magnitude.

Most metallic conductors have a positive temperature coefficient, that is to say that the resistance increases as the temperature rises. Vice versa, therefore, the voltage being known, the resistance and hence the mean temperature can be determined by measuring the current.

This method has the advantage, in the first place, that the temperature is determined at the point where the heat is generated, thus affording the briefest time constant for regulation.

In accordance with the invention, there are various possible ways of using the resistance of the heating element as the regulating magnitude.

One possibility derived from the invention is for the heating current to be switched off when the heating element reaches an upper desired-temperature setting and to be switched on again, as the heating temperature falls, when a lower temperature limit is reached. The great advantage of this arrangement is that even brief overloading of the heating wire is avoided. Because of the short time constant, the switching operations take place at such brief intervals that to all intents and purposes a static condition is achieved.

The invention also provides for the switch-on and switch-off to take place electronically, when alternating current is used, as the current passes through zero. In that way, there need be no fear of sparking trouble or contact wear. When current-feed gates are used, that is to say thyristors, Triacs or suchlike electronic switching components, the number of switching actions does not matter.

Another possible arrangement covered by the invention is to have the heating current switched off periodically when the heating element reaches an upper desired-temperature setting, the current being switched on again under time control after a given variable delay period.

One advantage of this method is that only one temperature value need be measured, during the switch-on period, measurement in the current-off period, such as is necessary in the arrangement described above, being dispensed with. Another advantage of this arrangement arises from the fact that very close regulation tolerances can be achieved when the interval between switch-on and switch-off is made short. The cost of switching, moreover, is lower than when, as in the arrangement mentioned previously, an upper and a lower temperature limit have to be measured.

Another arrangement conforming to the invention is to have the heating current switched off when the heating element reaches an upper variable desired-temperature setting but to have the current switched on again at fixed intervals of time.

This method offers a further advantage, in that measurement and observation of the switching actions against a fixed time base is very easy with the aid of an oscilloscope. Derived functions of regulation can be readily defined, using, for example, the ratio of switch-on period to switch-off period. Direct indication of the percentage switch-on period is possible.

Another important feature is the provision, in addition to the adjustment of the desired value for the heating element temperature, of means of limitation acting on the electronic regulation circuit arrangements, whereby the heating current is switched off whenever the heating element reaches a dangerous temperature.

All that is required here is a simple additional switching element, to enable protection to be given against running dry or overloading, as an addition to the regulating arrangements.

Particularly satisfactory regulation becomes possible when the actual temperature measured at the heated object is used as a further, additional, regulating magnitude and is compared with a desired-value temperature setting for the heated object, the difference thus arrived at being used in a voltage divider for setting the desired value for the heating element temperature.

Differential measurement is applied in this arrangement, that is to say that in fact only those changes in the resistance of the heating element which are determined by temperature are measured. Absolute measurement, which is naturally also possible, is thus avoided. Differential measurement saves switching cost and makes for more accurate regulation.

What is also important is that measurement of the actual temperatures should take place at a number of points and that the mean value or an extreme value should be compared with a variable desired-value temperature.

This arrangement takes account of differences in the nature of the heating element and its connection with the medium that is to be heated. In the case of heating elements immersed in water, for instance, it is possible to ensure in this way that regulation or switch-off shall take place, when the water level falls, as soon as even part of the heating element projects from the water and there becomes overheated. The temperature of the heating element is taken simply with the aid of NTC resistors.

There are also possibilities of arranging for the variable desired-value temperature to be controlled by the programming of a washing or washing-up machine or linked to a cooking or boiling process.

Temperature control with time or governed by the temperature of the medium that is to be heated is already an accepted part of programme control. All that is necessary is for the programme control arrangements to supply the characteristic magnitudes to the electronic regulator switching in the form of electrical magnitudes, used hitherto with contact systems.

As regards these devices for providing the measurement values, one recommended form involves the provision of such a device for providing the resistance value of the heating element, this acting on an electronic multivibrator circuit, the response wave of which is determined by a desired-value provider and which switches on and off the electronic switchgear lying in the heating circuit via a mains synchronization stage.

The employment of an electronic multivibrator circuit provides, in turn, a simple method for the contact-free setting of switching times or switching intervals. The space occupied and the construction cost are likewise very small, so that—and this is also of importance in the problem the invention is intended to solve—such heating regulation is compact and light, as well as reliable.

It is also of advantage for a temperature sensor to take the actual temperature at the heated object and play a part in determining whatever is the desired value for the heating element temperature.

The temperature sensors, which are NTC resistors, are thus used simultaneously for adjusting the actual and setting the desired temperatures.

The circuit is simplified, in accordance with the invention, by virtue of the fact that the switching hysteresis of one threshold-value amplifier switches the temperature limit values.

With the aid of normal electronic switching equipment, it is here also possible to arrange for the number of switching impulses to vary according to the variations in load on the heating circuit.

According to the invention, monostable or astable multivibrators can be used for setting up the switching operations.

Practical examples of the invention are illustrated in the accompanying drawings, from which and from the corresponding descriptive text further features of the invention will become apparent.

Figure 1:
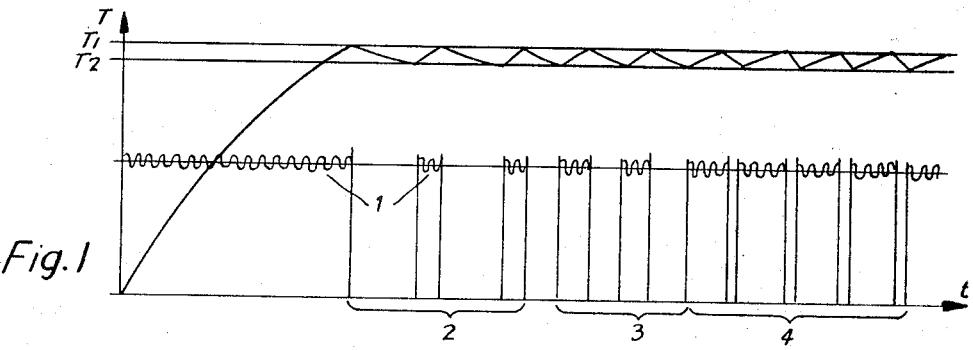
FIG. 1 is a regulation diagram for one arrangement conforming to the invention.

FIG. 1 is a temperature chart, in which temperature T is plotted against time $t$. T1 is the upper desired value of the heating-element temperature, which may be identical with the heating-wire temperature if a heating wire is used as the heating element. T2 is the lower limit value. Switch-on and switch-off are desired to occur between the values T1 and T2. The interrupted wave 1 of the heating current indicates how the switching operations vary for load variations in the sections 2, 3 and 4.

Figure 2:
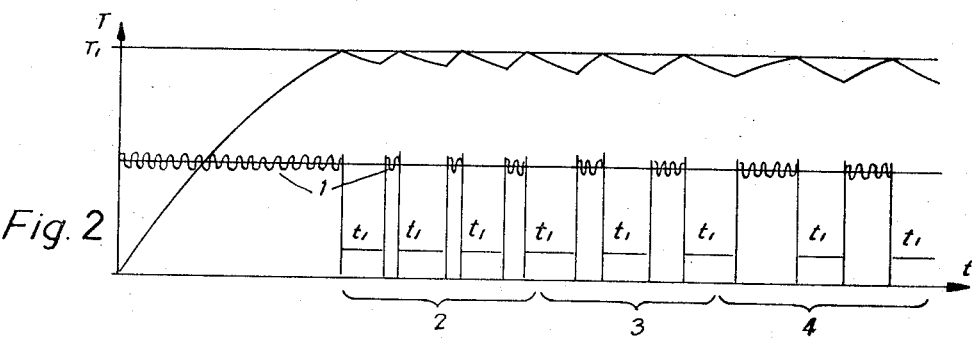
FIG. 2 is a regulation diagram for another such arrangement.

In FIG. 2, the heating element is switched off when the temperature T1 is reached. A predetermined variable time delay $t1$, however, is always introduced into the switch-on. Here again it can be seen that the switch-on and switch-off occur more or less frequently, according to the loading in the sections 2, 3 and 4.

The great advantage of this method is that only one temperature value T1 needs to be measured, and this only during the switch-on period. Measurement during switch-off, such as is required with an arrangement of the kind shown in FIG. 1, can be dispensed with. Another advantage is that, given a brief time $t1$, very close regulating tolerances are possible. In addition, the switching cost is lower than for two temperature measurements.

Figure 3:
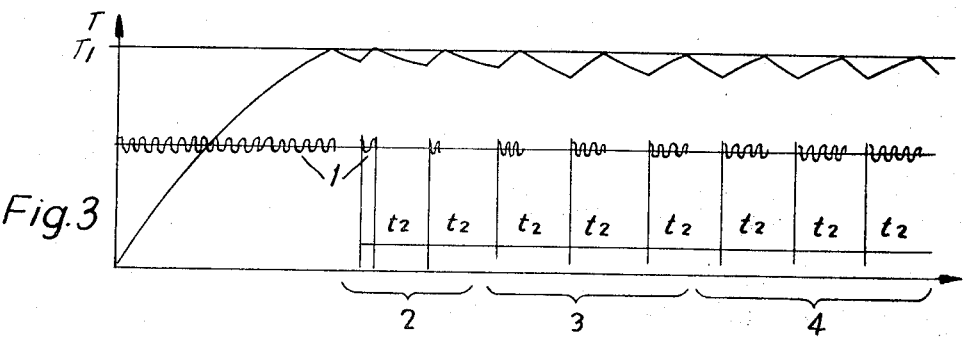
FIG. 3 is also a regulation diagram, for yet another such arrangement.

The regulation system shown in FIG. 3 employs the principle of switch-off governed by temperature when the temperature T1 is reached, with switch-on governed by time. This switch-on, or the switching period, depends on the fixed predetermined time intervals $t2$. It is independent of the moment of switch-off.

This method has the further advantage that measurement and observation of the switching processes against the fixed time base $t2$ with the aid of an oscilloscope is very simple. Moreover, derived regulation functions can be readily defined, using, for example, the ratio of switch-on period to switch-off period. Direct indication of the percentage switch-on period is possible.

Figure 4:
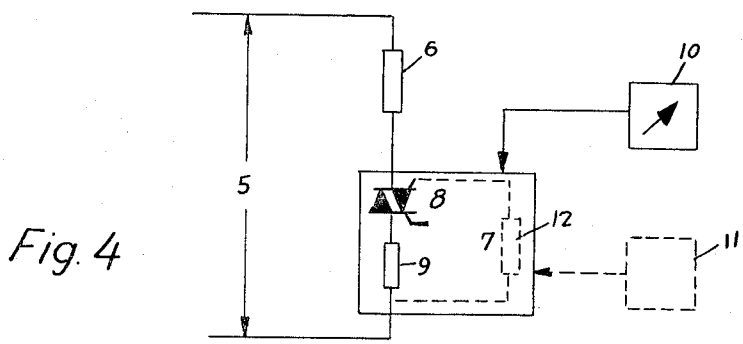
FIG. 4 is a block diagram for regulation carried out in conformity with the diagrams given in FIGS. 1 and 3.

FIG. 4 shows one regulating arrangement in the form of a block diagram. The heating element 6 is fed from the AC mains 5 through the electronic regulator 7. The electronically controlled switching element, namely the supply gate 8, which may be a Triac, for example, is shown diagrammatically connected in series with a base resistor, 9. A voltage analogous to the heating-wire temperature is derived from the measuring resistor and fed by way of an amplifier control circuit designed in accordance with the invention to the supply gate 8, when the desired value is reached, as a blocking or clearing impulse, as the case may be. A setting device, 10, enables the desired values to be varied. The regulator 7 should be synchronised with the mains voltage in the conventional way, to ensure that the switch-on likewise always take place as the current passes through zero. When this regulation is carried out as in FIG. 1, a second base resistor, 12, is needed, for measuring the resistance of the heating wire with the heat switched off. Also, a variable time control actuator 11 having the desired time period characteristics can be employed for heating unit control in the mode illustrated in FIG. 3 as discussed previously.

The setting device 10 should be such that overloading the heating wire is avoided in any case, even if no heat is being dissipated. Two examples of this may be given. With electrically heated washing machines, there is a risk of drying-out under heat, if for any reason there is no water in the machine. Ordinary thermostats usually fail in such cases, because they respond too late, and the heating elements are destroyed. What is particularly dangerous about this is that, with the extremely high temperatures arising in such cases, the insulation resistance of the heating wires is reduced, so that the person operating the machine may be endangered, in the case of badly earthed machines, by coming into contact with an increased voltage.

Regulation such as here proposed excludes this risk entirely, because the temperature of the heating wire does not rise even if the machine dries out under heat.

The same applies to stove boiling plates, which normally overheat if nothing is standing on the plate for cooking or boiling.

Overheating being thus out of the question, cheaper heating-wire alloys can be used and the life expectancy is greater.

There are special advantages to be derived from the controlled regulation of the desired temperature of the heating wire, by means of, for example, a temperature sensor at the heated object. As variation in the temperature setting can be simply achieved by means of the regulating voltage of a temperature sensitive resistor (thermistor), expensive thermostats become superfluous. Such regulation can be combined with gradual reduction in the temperature of the heating wire as the desired temperature is approached by whatever is being cooked, for instance.

Figure 5:
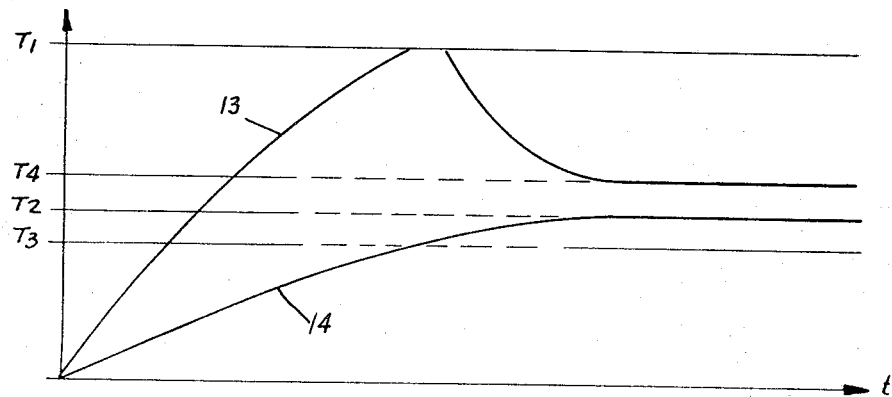
FIG. 5 is a regulation diagram in which temperature sensors are fitted at the heated object or in the heating element.
Figure 6:
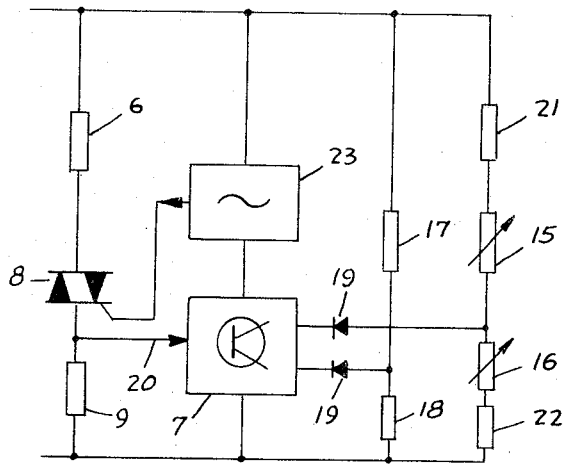
FIG. 6 is a circuit diagram corresponding to the regulation diagram in FIG. 5.

FIG. 5 is a diagram of regulation of this type, FIG. 6 being the corresponding block diagram.

In FIG. 5, the curve 13 shows the variation in the temperature of the heating wire of the heating element 6. Following switch-on, this temperature rises to the value Tl. This maximum heating-wire temperature is determined by the voltage divider provided by the resistors 17 and 18. The curve 14 shows the actual temperature measured by the thermistor 15 from whatever is being cooked, for instance, the desired value for which is set by the housewife by means of the control 16.

As soon as the actual temperature 14 approaches the value T2, there is a gradual reduction in the desired-value temperature of the heating wire, beginning at a value T3. The start of this process is marked by the regulating voltage at the voltage divider 15/16 falling below the voltage at the voltage divider 17/18. Both voltages are decoupled in the normal way by means of the diodes 19 for example.

REgulation of the heating-wire temperature and the temperature of whatever is being cooked finally reaches a steady state at the values T4 and T2 respectively, the heating-wire temperature naturally being somewhat higher, so as to cover heat losses and maintain the transmission of heat to whatever is being cooked.

Since the range of regulation of the thermistor and of the setting control 16, for example, can readily be adapted by means of the resistors 21 and 22 respectively, for example, to the requirements as to temperature and regulation, the advantages of such regulation, acting back on the heating-wire temperature are obvious.

FIG. 6 shows further details of such a regulating arrangement. In addition to the components already mentioned, such as the measuring resistor 9, there is the Triac 8 with the regulator proper 7, containing, for example, a transistor amplifier with a bistable multivibrator, which responds to the measurement voltage fed to it by a conductor 20 and to the regulating voltages from the voltage dividers 17/18 and 15/16 and switches back with a constant time delay, switching impulses going via the synchronising switch 23 to the Triac 8. The purpose of the synchronising switch 23 is to transmit the switch-on impulses to the Triac 8 only as the alternating current is passing through zero, so as to give a power-less and trouble-free switch-on.

It is possible, of course, for the desired temperatures both of the heating wire and of the object that is to be heated to be controlled or varied in a programme.

Figure 7:
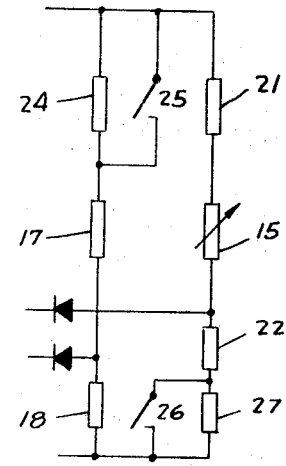
FIG. 7 is a circuit diagram showing how the desired temperatures of the heating wire and of the object that is to be heated are controlled or varied in a programme.

FIG. 7 shows an example of this kind. The contact 25 bridges over the resistor 24 and thus alters the maximum heating-wire temperature as programmed. The contact 26 bridges over the resistor 27 and thus alters the desired value for the heated object.

The examples and circuit variations shown by no means represent a limitation on the scope of the invention, for with the multiplicity of semiconductor elements the most suitable circuit arrangements can be determined in every particular case. Moreover, the measurement voltage can be derived differently—for instance, through a transformer instead of the measuring resistor 9.

If necessary, of course, the control circuits can be galvanically separated from the power circuits, this being done in the usual manner. The same applies to the current feed for the control circuits.

The reference voltages may suitably be derived from the mains voltage, to achieve equalization of fluctuations in the mains voltage. The prefix R as applied with numerals in the drawings is indicative of a resistor and the prefix D is similarly indicative of a diode. In like manner, the prefix T when associated with numerals in the drawings is indicative of a transistor. Moreover, it should be noted that the several circuit diagrams in the different FIGS. in the drawings include common components operative in the same manner; such components are exemplified by the heating element 6. For this reason, the same numerals have been employed on such common components in different FIGS. in the interest of clarity.

Again, because of the simplicity of the measurement of actual temperatures, it is possible to provide several measurement points, the mean value or extreme value of which may be used as the regulating magnitude.

The supply gate 8 (FIG. 8) is controlled by a threshold-value amplifier (output C) consisting of the transistors T6 and T7 and the resistors R13 to R17. The input signal for this threshold-value amplifier is taken from a differential amplifier (output E). The differential amplifier consists of the transistors T1 and T2 and the resistors R3 to R6. The output signal at point E is proportional to the difference between the two input signals at the points F and G. The potential at the point F is determined by the resistance of the heater winding 6. As the wire temperature rises, the resistance of the heating wire increases and the current through the voltage divider formed by 9, 8 and 6 falls and so, therefore, does the voltage drop at the base resistor 9. This voltage is rectified by diode D1 and applied to the resistor R2. When the potential at the input F falls below the potential at the input G, the potential at the output E acquires negative values and 8 is switched off via the threshold amplifier.

The potential G, during the start of the heating period, is initially determined, through the decoupling diode D2, by the potential M of the voltage divider R7/R8. This voltage divider limits the maximum wire temperature to the value TI. As soon as the NTC senser R9 reduces its value with rising temperature, so that the signal K derived from R33 becomes more negative than the signal H derived from the desired-value setter R32, the potential L likewise acquires a negative value with the potential across resistors R10 and R11 similarly varying with the terminal potential at the transistors T3 and T4 to which they are respectively connected. Hence, when T3 (FIG. 5) is reached, the second differential amplifier takes over through D3 the control of the first differential amplifier at the input G. The wire temperature, corresponding to the curve 13 (FIG. 5), and hence the heating power, is regulated downwards and, as the cooking temperature rises, is brought nearer to the value T4, while whatever is being cooked reaches the temperature 12 set by the desired-value setter 10.

Figure 8:
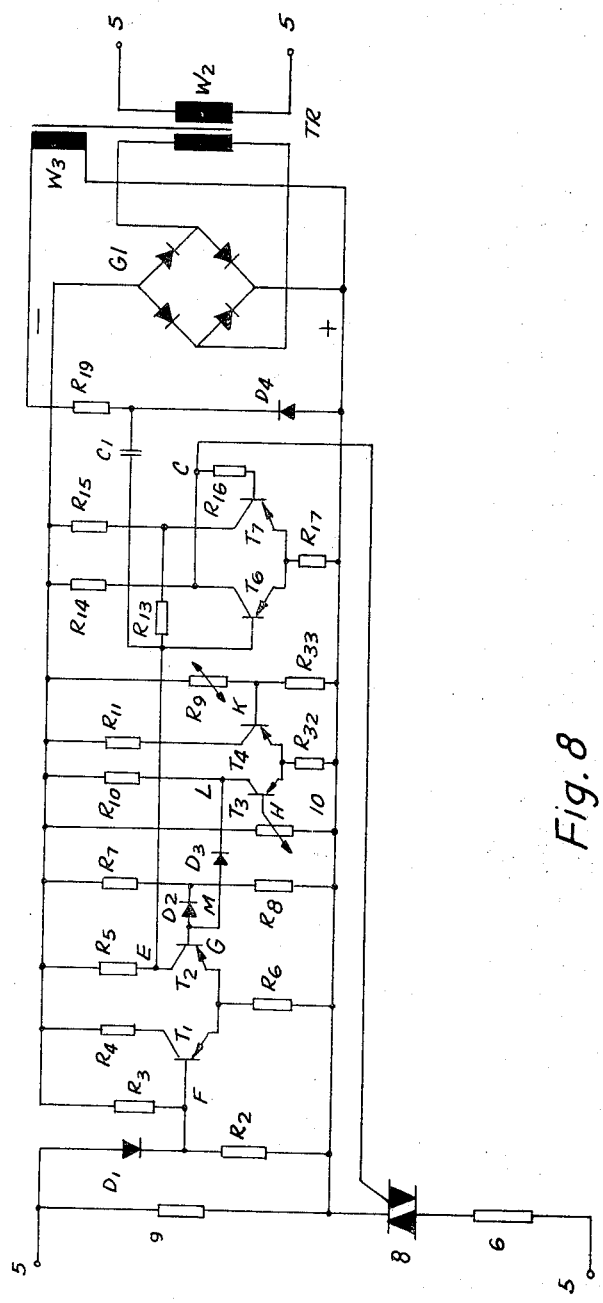
FIG. 8 shows the electronic regulation circuit enabling regulation as in FIG. 1 to be carried out using the block diagram in FIG 4.

In the electronic circuit in FIG. 8, the two temperature limit values T1 and T2 in FIG. 1 are determined by the switching hysteresis of the threshold-value amplifier (T6/T7 with R14 to R17). Superimposed on the input signal of this amplifier are synchronising pulses generated via a second secondary winding W3 of the transformer TR, having a primary winding W2, the resistor R19, the diode D4 and the capacitor C1. These synchronising pulses ensure that the supply gate 8 is switched in as the current passes through zero.

Figure 9:
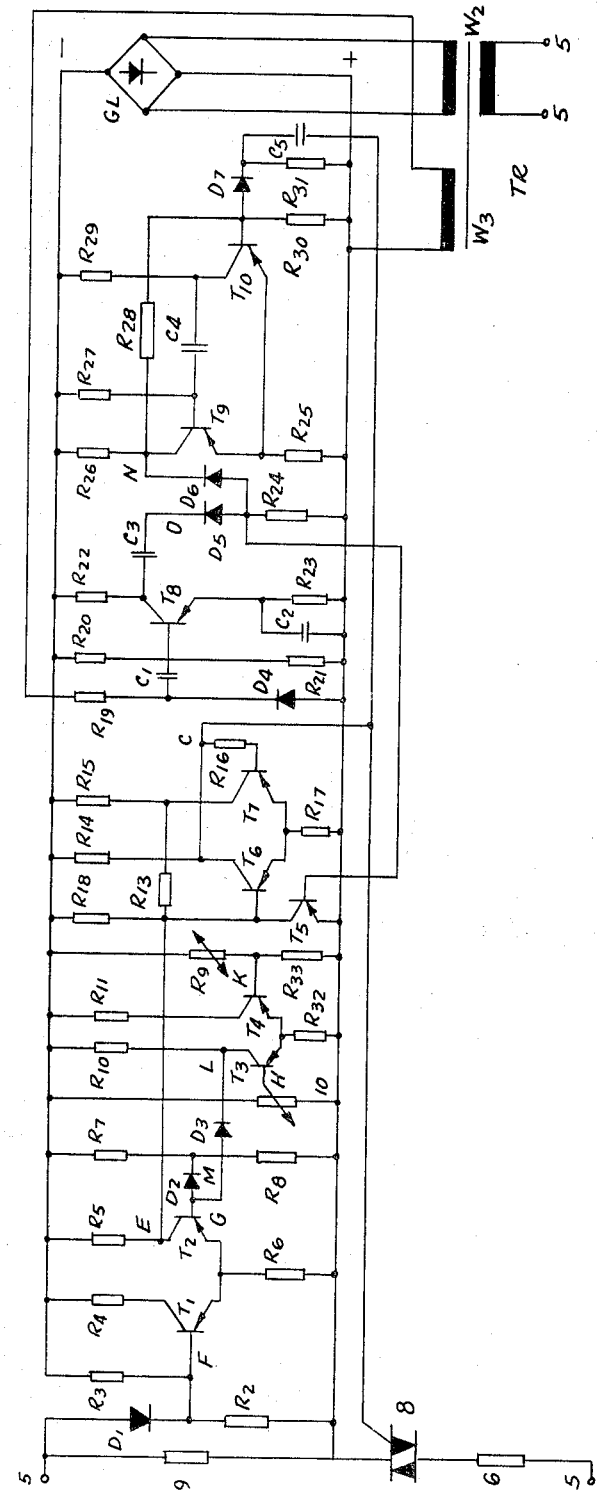
FIG. 9 shows the electronic circuit for regulation as in FIG. 2.

The interval $t1$ is obtained in the electronic circuit in FIG. 9 which provides a mode of operation of the type illustrated in FIG. 2 by virtue of the fact that the change of potential at C (output of the threshold-value amplifier T6/T7), when the supply gate 8 is switched out via C5, R31 and D7, trips a monostable multivibrator consisting of the transistors T9 and T10, the resistors R25 to R30 and the capacitor C4. During the period $t1$, the potential N remains negative. The time control for $t1$ consists of C4 and R27.

By means of a second secondary winding W3 of the transformer TR and R19, D4 and C1, a synchronising impulse is generated, which is amplified by the amplifier stage T8, R20 to R23 and C2 and passed as signal 0 to D5 which is connected through capacitor C3 to transistor T8. When the monostable multivibrator switches back at the end of the period $t1$, N becomes positive by virtue of its consection through diode D6. With 0 and N positive, the transistor T5 is blocked and the input signal E at the threshold-value amplifier T6/T7 becomes negative. The supply gate 8 is therefore switched in again at the end of the interval $t1$, given the occurrence of a synchronising impulse. Voltage N is communicated through a resistor 28 to a common terminal between transistor T10 and resistor R30 as shown and resistor R29 is connected to a common terminal connection between the capacitor C4 and the transistor T10. A bridge GF provides negative and positive bias for the other circuit components and is connected to the secondary winding W2.

Figure 10:
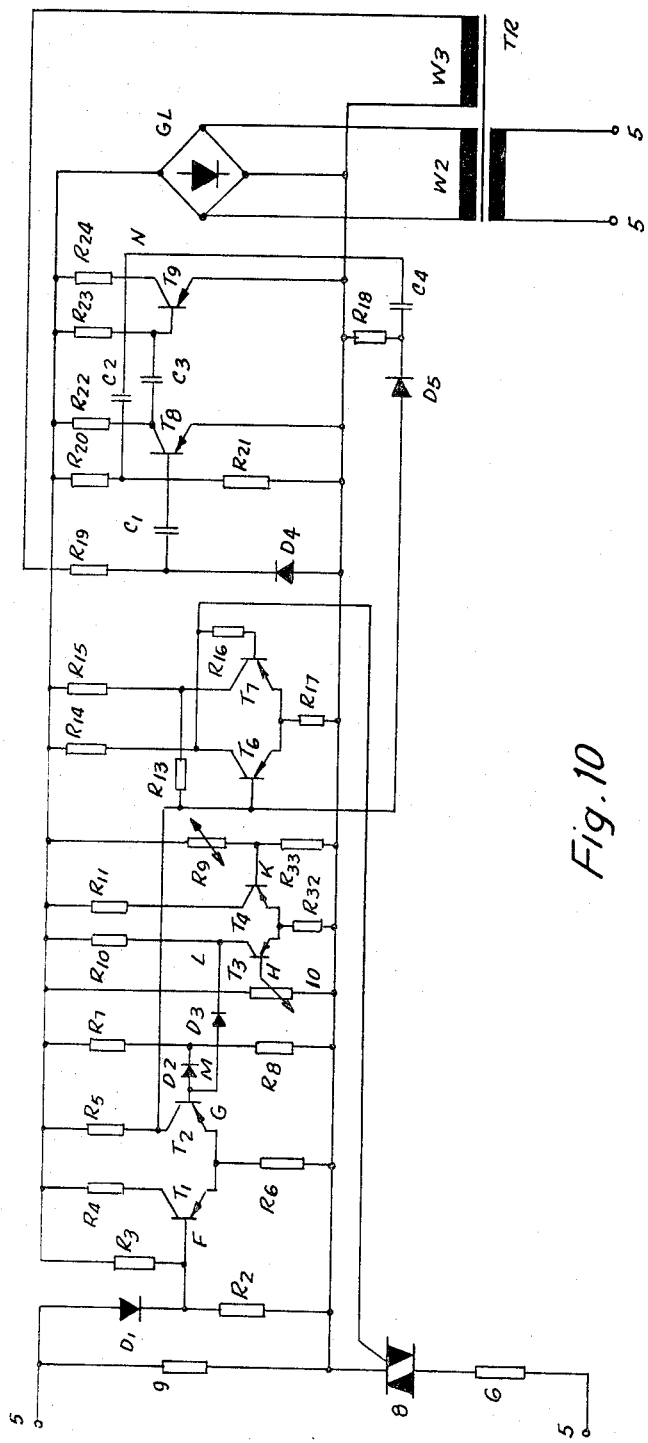
FIG. 10 shows the electronic circuit enabling regulation to be carried out as in the diagram shown in FIG. 3.

In the electronic circuit in FIG. 10 which provides a mode of operation illustrated in FIG. 3, constant switch-on is achieved by feeding to an astable multivibrator, consisting of T8, T9, R20 to R24, C2 and C3, the synchronization pulses generated by the second winding W3 of the transformer TR and R19, D4 and C1. This multivibrator oscillates at a frequency of $t2^{-1}$ c./s. Through the superimposed synchronization pulses, the potential N at the output changes at the moment the mains voltage passes through zero. The impulse produced with R18, C4 and D5 is fed to the input of the threshold-value amplifier T6/T7 and the supply gate 8 is thus regularly switched in again at the end of the period $t2$.

I claim:
1. A control system for regulating an electric heating element in response to variations in the electrical resistance of the heating element for switching on and switching off supply current to said heating element, said system comprising a solid state supply gate switching element, a first voltage divider for establishment of a maximum heating temperature of the heating element, a second voltage divider consisting of a thermistor for measuring the temperature of material being heated by said heating element and an adjustable resistor, said first voltage divider and said second voltage divider being connected in a bridge circuit in parallel relationship to said solid state supply gate switching element, a base resistor and said heating element connected in series with said solid state supply gate switching element and a control circuit including a transistor amplifier and a multivibrator electrically connected to said first and second voltage dividers and to said solid state supply gate switching element through synchronizing switch means for providing control signals to said solid state supply gate switching element to switch on and switch off supply current to said heating element.

2. The system of claim 1 additionally including conductor means connected between said transistor amplifier and said multivibrator and the series connection between said solid state supply gate and said base resistor.

3. The invention of claim 2 additionally including pyrometer means operable for controlling supply current to said heating element for terminating the supply current to avoid damage to the heating element in response to the means being heated reaching a cutoff temperature.

4. The invention of claim 2 wherein said first and second voltage dividers include parallel resistor means connectable by switch means for varying the balance capacity of said dividers to provide a consequent variation of the temperature to which the heating element is heated and the temperature of the heated object.